Jan. 6, 1931. J. F. SCHYLANDER 1,787,998
SPRAY
Filed Oct. 6, 1928
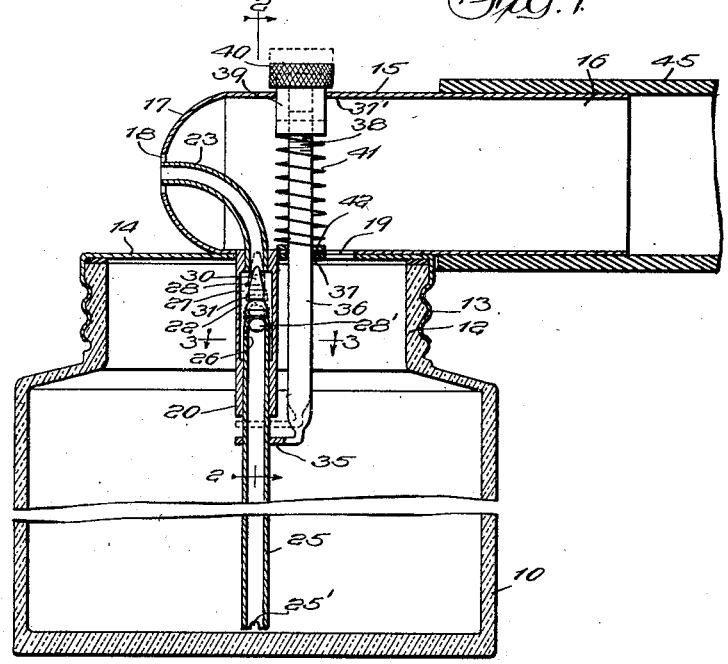
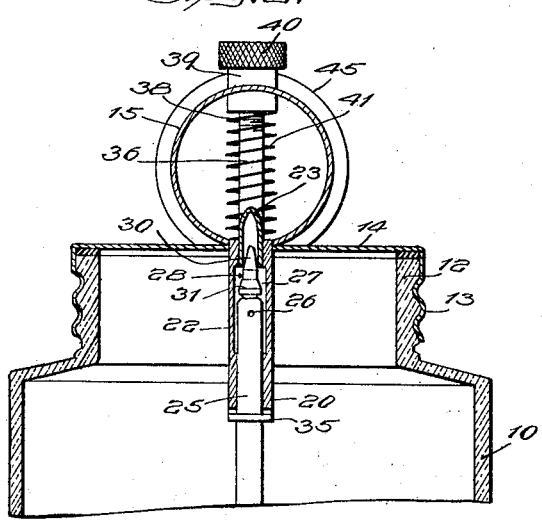
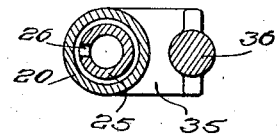
Inventor:
John F. Schylander Patented Jan. 6, 1931

1,787,998

UNITED STATES PATENT OFFICE

JOHN F. SCHYLANDER, OF CHICAGO, ILLINOIS

SPRAY

Application filed October 6, 1928. Serial No. 310,776.

My invention relates to sprays and has to do more particularly with devices for producing a spray of finely atomized liquid material such as paint or other pigment, disinfectant, fungicides and insecticides, etc.

An object of my invention is to provide a device for producing a spray of material in a quantity variable at the will of an operator and for any desired length of time with slight effort on the part of the operator.

A further object is to produce a device of the class described which will consist of a small number of relatively simple parts, the device being inexpensive to manufacture, rugged, and easy to operate.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

Referring now to the drawings forming a part of this specification, wherein like reference characters indicate like or corresponding parts;

Fig. 1 represents a vertical sectional view of a device embodying my invention;

Fig. 2 is a sectional view taken on line 2—2 of Fig. 1; and

Fig. 3 is a sectional view on an enlarged scale taken on line 3—3 of Fig. 1.

In the particular preferred embodiment shown in the drawings, the numeral 10 indicates a container of any desired shape, size or material for holding the liquid which is to be sprayed. This container has a neck 12 which is preferably cylindrical and is exteriorly threaded to engage a threaded portion 13 of a cap member 14. The cap member 14 is preferably formed of sheet metal or the like, and has secured to the upper portion thereof, preferably by soldering or other suitable means, a tubular member 15. This tubular member is open at one end, as at 16, and terminates at its opposite end in the hemispherical portion 17, apertured as at 18. An aperture 19 in the tubular member 15 and in the cap 14 provides communication between the interior of the tubular member 15 and the interior of the container 10.

A tubular valve casing 20 is secured to the inside of the cap so as to project downwardly into the container 10, this casing communicating with the interior of the tubular member 15. Seated within the upper portion of the tubular member 20 and communicating therewith, is a curved tubular member 23, this tubular member terminating within the aperture 18. It will be noted from Fig. 1 that the end of the tubular member 23 is substantially flush and concentric with the aperture, an annular space being provided between the tubular member 23 and the walls of the aperture.

Slidably disposed within the valve casing 20 is a tubular member 25, an aperture or port 26 being provided in the wall of this member adjacent its upper extremity and a notch 25' is provided in the bottom thereof. A valve member 28 formed on the end of the tubular member 25 is adapted to seat in the end of the tubular member 23, this valve member having a head portion 30. The head 30 is graduated in diameter, being substantially frusto-conical. The valve member is secured to the stem 25 by means of a ball joint 28', the valve head being spun over as at 31, so that this member is slightly adjustable within its seat.

As clearly shown in Figs. 1 and 2, the bore of the tubular member 20 is enlarged adjacent its upper end, as at 22, so as to provide a chamber 27 around the tubular member 25 and valve 28.

Secured to the tubular member 25 by means of solder or other suitable means is an arm 35 carried by a rod 36. The rod 36 extends through the tubular member 15 passing through an aperture 37 formed in this member and in the cap 13 and an aperture 37' in the member 15, and is threaded at its upper extremity as at 38. Threadedly engaging the free end of the rod 36 is a manipulating member 39 having a knurled head 40. A helical spring 41 disposed on the rod 36 engages the lower portion of the manipulating member 39 and carries at its opposite end an annular ring 42 which bears against the tubular member 15, so that the spring 41 is compressed between this member and the manipulating member 39.

In operation, the tubular member 15 is connected to a suitable conduit 45 leading to any convenient source of air pressure (not shown). Such source of pressure may be a vacuum cleaner, an air pump, or a compressed air reservoir. In the normal condition of the device, as indicated by the dotted lines in Fig. 1, the valve head 30 will be seated within the opening of the tubular member 23 so as to prevent the flow of liquid through the tubular member 23, the valve member being resiliently urged upwardly by the spring 41 acting on the rod 36. When it is desired to produce a spray, the manipulating member 39 is manually depressed against the action of the spring 41. This results in moving the rod 36 downwardly, this rod carrying with it the tubular valve stem 25 so that the bottom of this stem is adjacent the floor of the container 10, and also moving downwardly the valve member 28, clearing the entrance to the tubular member 23. The position of the parts will then be substantially as indicated by the full lines in Fig. 1. When this occurs, a portion of the air being forced through the tubular member 15 which passes through the aperture 19 into the container 10 will force the liquid up into the tube 25, out of the port 26, into the chamber 27, and through the tubular member 23. Upon issuing from the end of the tubular member 23, this liquid will encounter a portion of the air which has been forced directly through the tubular member 15, this air issuing from the aperture 18 in a strong conical blast. The effect of this air current around the opening of the tubular member 23 is to cause a violent dispersion of the liquid, thus producing a finely atomized cloud. The air issuing from the aperture 18 also tends to set up a vacuum within the tube 23 and thus assists in raising the liquid from the container 10.

When it is desired to cut off the spray, the manipulating member is released. The spring 41 thereupon immediately raises the rod 36 and the valve member and seats this member in the tubular member 23 so as to cut off the flow of liquid therethrough.

It will be noted from the above description that the valve member 28 is secured to the stem 25 by means of the ball joint 28′. This results in the valve head being slightly adjustable about this joint so as to insure its seating properly within the opening of the tubular member 23.

By reason of the aperture 25′ at the very bottom of the tubular member 25, the last trace of liquid may be removed from the container 10.

The volume of the spray may readily be controlled by means of the manipulating member 39. When it is desired to increase or decrease the volume of spray, the knurled head 40 is rotated in the proper direction. This results in either increasing or decreasing the distance between the knurled head 40 and the top of the tubular member 15 and thus varying the distance that this member may be depressed. Inasmuch as the valve displacement is equal to the displacement of the knurled head 40, it follows that the amount of liquid passing through the valve will thus be varied.

The device is very easily carried to any point where the spray is desired, the conduit 45 usually being flexible. The tubular member 15 may, if desired, be used as a handle and the manipulating member displaced by the thumb, thus leaving the other hand free.

Having thus described my invention it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the class described and in combination with closure means for a container, an air conduit having an inlet opening and an outlet opening, a liquid conduit having an outlet opening within said air conduit with an air space therebetween, said liquid conduit comprising a reciprocable hollow valve stem having an adjustable head, and manually operable means for actuating said valve.

2. In a device of the class described and in combination, an air conduit having an inlet opening and an outlet opening, a tubular member having an outlet opening within that of said air conduit with an air space therebetween, a second tubular member communicating with said first tubular member and having a valve member thereon cooperating with said first tubular member for controlling the flow of liquid therethrough, and means for manipulating said second tubular member for controlling said valve member.

3. In a device of the class described and in combination, an air conduit having an inlet opening and an outlet opening, a tubular member having an outlet opening within that of said air conduit with an air space therebetween, a valve casing associated with said tubular member, a second tubular member reciprocable within said valve casing and communicating therewith and having a valve member thereon for controlling the flow of liquid through said first tubular member, and means for manually reciprocating said second tubular member and said valve member.

4. In a device of the class described and in combination, an air conduit having an inlet opening and an outlet opening, a tubular member having a outlet opening within that of said air conduit with an air space therebetween, a valve casing associated with said tubular member, a second tubular member reciprocable within said valve casing and communicating therewith and having a valve head thereon for controlling the flow of liquid through said first tubular member, said valve head being adjustably secured to said second tubular member, and means for manually reciprocating said second tubular member and said valve member.

5. In a device of the class described and in combination, an air conduit having an inlet opening and an outlet opening, a tubular member having an outlet opening within that of said air conduit with an air space therebetween, a valve casing associated with said tubular member, a second tubular member slidable in said valve casing and communicating therewith, and a valve head on said second tubular member cooperable with said first tubular member, said valve casing cooperating with said second tubular member and valve head to provide a chamber, and means for manually reciprocating said second tubular member and said valve head.

6. In a device of the class described and in combination, an air conduit having an inlet opening and an outlet opening, a tubular member having an outlet opening within that of said air conduit with an air space therebetween, a valve casing associated with said tubular member, a second tubular member slidable in said valve casing and communicating therewith, and a valve head adjustably secured to said second tubular member by a ball and socket joint, said valve head being cooperable with said first tubular member, a portion of the wall of said valve casing cooperating with said second tubular member and valve member so as to provide a chamber, and means for manually reciprocating said second tubular member and said valve head.

7. In a device of the class described and in combination with a container, closure means for said container, an air conduit carried by said closure means having an inlet opening and an outlet opening, a liquid conduit having an outlet opening within said air conduit with an air space therebetween, said liquid conduit comprising a reciprocable valve having a hollow stem, and manually operable means for reciprocating said valve, the end of said valve stem being apertured and disposed adjacent the bottom wall of said container when manually actuated to its lower limit.

8. In a device of the class described and in combination, a container, an air conduit having an inlet opening and a main outlet opening, said conduit having a second outlet opening continuously discharging into said container, a liquid conduit having an outlet opening within said air conduit, said liquid conduit comprising a pair of reciprocally movable telescopic tubular members, means for manually reciprocating said members, and valve mechanism operable to open and close said liquid conduit by the reciprocation of said members.

In tesimony whereof, I have hereunto signed my name.

JOHN F. SCHYLANDER.